US012103537B2

(12) United States Patent
Hirosawa et al.

(10) Patent No.: US 12,103,537 B2
(45) Date of Patent: Oct. 1, 2024

(54) DRIVING ASSISTANCE DEVICE, DRIVING ASSISTANCE METHOD, AND STORAGE MEDIUM

(71) Applicant: HONDA MOTOR CO., LTD., Tokyo (JP)

(72) Inventors: Nozomu Hirosawa, Wako (JP); Daichi Kato, Wako (JP); Masashi Kanesaka, Wako (JP); Tomotaka Teramachi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 332 days.

(21) Appl. No.: 17/679,149

(22) Filed: Feb. 24, 2022

(65) Prior Publication Data

US 2022/0315001 A1    Oct. 6, 2022

(30) Foreign Application Priority Data

Mar. 31, 2021  (JP) .................................. 2021-062233

(51) Int. Cl.
*B60W 30/18* (2012.01)
*B60W 50/14* (2020.01)

(52) U.S. Cl.
CPC ...... *B60W 30/18163* (2013.01); *B60W 50/14* (2013.01); *B60W 2050/146* (2013.01); *B60W 2710/20* (2013.01)

(58) Field of Classification Search
None
See application file for complete search history.

(56) References Cited

U.S. PATENT DOCUMENTS 11,850,940 B2 * 12/2023 Shimizu ................. G09G 3/002
2017/0210394 A1 *  7/2017 Yamada .................... B62D 6/00
(Continued)

FOREIGN PATENT DOCUMENTS

JP    2017-033045    2/2017
JP    2019-036086    3/2019
(Continued)

OTHER PUBLICATIONS

Japanese Office Action for Japanese Patent Application No. 2021-062233 mailed Nov. 1, 2022.
(Continued)

*Primary Examiner* — Adam D Tissot
(74) *Attorney, Agent, or Firm* — Amin, Turocy & Watson, LLP

(57) ABSTRACT

According to an embodiment, a driving assistance device includes a recognizer configured to recognize a surrounding situation of a vehicle, a driving controller configured to control at least steering of the vehicle on the basis of the surrounding situation recognized, a receiver configured to receive an operation of an occupant of the vehicle, and an output controller configured to cause an output to output a traveling state of the vehicle. The driving controller causes a lane change of the vehicle to be made when a receiver receives an instruction for allowing the vehicle to make the lane change and a condition in which the lane change is made is satisfied. The output controller causes the output to output information about the lane change when the lane change has not been started even though a first prescribed time period has elapsed after the receiver received the instruction.

6 Claims, 7 Drawing Sheets

(56) References Cited

U.S. PATENT DOCUMENTS

2018/0297611 A1* 10/2018 Fujisawa ......... B60W 30/18163
2019/0047561 A1*  2/2019 Nishiguchi ........... B60W 50/10

FOREIGN PATENT DOCUMENTS

| JP | 2019-043432 | 3/2019 |
| JP | 2020-185982 | 11/2020 |
| WO | 2017/022197 | 2/2017 |

OTHER PUBLICATIONS

Japanese Office Action for Japanese Patent Application No. 2022-205716 mailed Dec. 5, 2023.

* cited by examiner

FIG. 3

| DRIVING MODE | CONTROL STATE | TASK |
|---|---|---|
| MODE A | AUTOMATED DRIVING | SURROUNDING MONITORING: UNNECESSARY<br>STEERING GRIP: UNNECESSARY |
| MODE B | DRIVING ASSISTANCE | SURROUNDING MONITORING: NECESSARY<br>STEERING GRIP: UNNECESSARY |
| MODE C | DRIVING ASSISTANCE | SURROUNDING MONITORING: NECESSARY<br>STEERING GRIP: NECESSARY |
| MODE D | DRIVING ASSISTANCE | SURROUNDING MONITORING: NECESSARY<br>AT LEAST CERTAIN DEGREE OF DRIVING OPERATION IS NECESSARY |
| MODE E | MANUAL DRIVING | SURROUNDING MONITORING: NECESSARY<br>DRIVING OPERATION IS NECESSARY TOGETHER WITH STEERING AND/OR ACCELERATION/DECELERATION |

↑ TASK: MILD

↓ TASK: SEVERE

DRIVING ASSISTANCE DEVICE, DRIVING ASSISTANCE METHOD, AND STORAGE MEDIUM

CROSS-REFERENCE TO RELATED APPLICATION

Priority is claimed on Japanese Patent Application No. 2021-062233, filed Mar. 31, 2021, the content of which is incorporated herein by reference.

BACKGROUND

Field of the Invention

The present invention relates to a driving assistance device, a driving assistance method, and a storage medium.

Description of Related Art

In recent years, research on automated driving for automatically controlling the traveling of vehicles has been conducted. In this regard, technology for outputting a command for changing a traveling lane of a host vehicle from a first lane to a second lane to a driving controller for controlling automated driving when an operation of a user to move a host vehicle object within an image displayed on a display from the first lane to the second lane is received is known (for example, PCT International Publication No. WO 2017/022197).

SUMMARY

Incidentally, when a situation in which a lane change cannot be started due to an influence of a surrounding situation or the like continues after an occupant issues a lane change instruction, the occupant may forget that he or she has issued the lane change instruction. Thus, if the lane change is made after a while from the issuance of the lane change instruction, the lane change may be made in a state in which the occupant is not expecting the lane change and appropriate driving assistance may not be provided.

Aspects of the present invention have been made in consideration of such circumstances and an objective of the present invention is to provide a driving assistance device, a driving assistance method, and a storage medium capable of providing more appropriate driving assistance.

A driving assistance device, a driving assistance method, and a storage medium according to the present invention adopt the following configurations.

(1): According to an aspect of the present invention, there is provided a driving assistance device including: a recognizer configured to recognize a surrounding situation of a vehicle; a driving controller configured to control at least steering of the vehicle on the basis of the surrounding situation recognized by the recognizer; a receiver configured to receive an operation of an occupant of the vehicle; and an output controller configured to cause an output to output a traveling state of the vehicle, wherein the driving controller causes a lane change of the vehicle to be made when a receiver receives an instruction for allowing the vehicle to make the lane change and a condition in which the lane change is made is satisfied, and wherein the output controller causes the output to output information about the lane change when the lane change has not been started by the driving controller even though a first prescribed time period has elapsed after the receiver received the instruction.

(2): In the above-described aspect (1), the information about the lane change includes information about cancelation of the lane change.

(3): In the above-described aspect (1), the output controller causes a process of outputting the information to end when the receiver has not received an instruction for canceling the lane change even though a second prescribed time period has elapsed after the information about the lane change was output to the output, and the driving controller causes a process of making the lane change to continue.

(4): In the above-described aspect (3), the second prescribed time period is shorter than the first prescribed time period.

(5): In the above-described aspect (1), the output includes a display and the output controller causes the display to display an image showing information about the lane change.

(6): In the above-described aspect (3), the output controller causes the output to output information about the lane change when the lane change has not been started by the driving controller even though a third prescribed time period has elapsed after the process of outputting the information was ended.

(7): In the above-described aspect (6), the third prescribed time period is a time period equal to the first prescribed time period or a time period that is changed in accordance with the number of times the information about the lane change has been output or the time when the information about the lane change has been output.

(8): According to an aspect of the present invention, there is provided a driving assistance method including: recognizing, by a computer, a surrounding situation of a vehicle; controlling, by the computer, at least steering of the vehicle on the basis of the recognized surrounding situation in a driving controller; receiving, by the computer, an operation of an occupant of the vehicle; causing, by the computer, an output to output a traveling state of the vehicle; causing, by the computer, a lane change of the vehicle to be made when an instruction for allowing the vehicle to make the lane change is received and a condition in which the lane change is made is satisfied; and causing, by the computer, the output to output information about the lane change when the lane change has not been started by the driving controller even though a first prescribed time period has elapsed after the instruction was received.

(9): According to an aspect of the present invention, there is provided a computer-readable non-transitory storage medium storing a program for causing a computer to: recognize a surrounding situation of a vehicle; control at least steering of the vehicle on the basis of the recognized surrounding situation in a driving controller; receive an operation of an occupant of the vehicle; cause an output to output a traveling state of the vehicle; cause a lane change of the vehicle to be made when an instruction for allowing the vehicle to make the lane change is received and a condition in which the lane change is made is satisfied; and cause the output to output information about the lane change when the lane change has not been started by the driving controller even though a first prescribed time period has elapsed after the instruction was received.

According to the above-described aspects (1) to (9), it is possible to provide more appropriate driving assistance.

BRIEF DESCRIPTION OF THE DRAWINGS

FIG. 3 is a diagram showing an example of relationships between driving modes, control states of a vehicle, and tasks.

DESCRIPTION OF EMBODIMENTS

Embodiments of a driving assistance device, a driving assistance method, and a storage medium of the present invention will be described below with reference to the drawings. Hereinafter, an embodiment in which the driving assistance device is applied to an automated driving vehicle will be described as an example. For example, automated driving is a process of executing driving control by automatically controlling one or all of steering, acceleration, and deceleration of the vehicle. The driving control of the vehicle may include, for example, various types of driving assistance control such as adaptive cruise control (ACC), auto lane changing (ALC), a lane keeping assistance system (LKAS), and traffic jam pilot (TJP). Driving of the automated driving vehicle may be controlled according to manual driving of an occupant (a driver).

[Overall Configuration]

Figure 1:
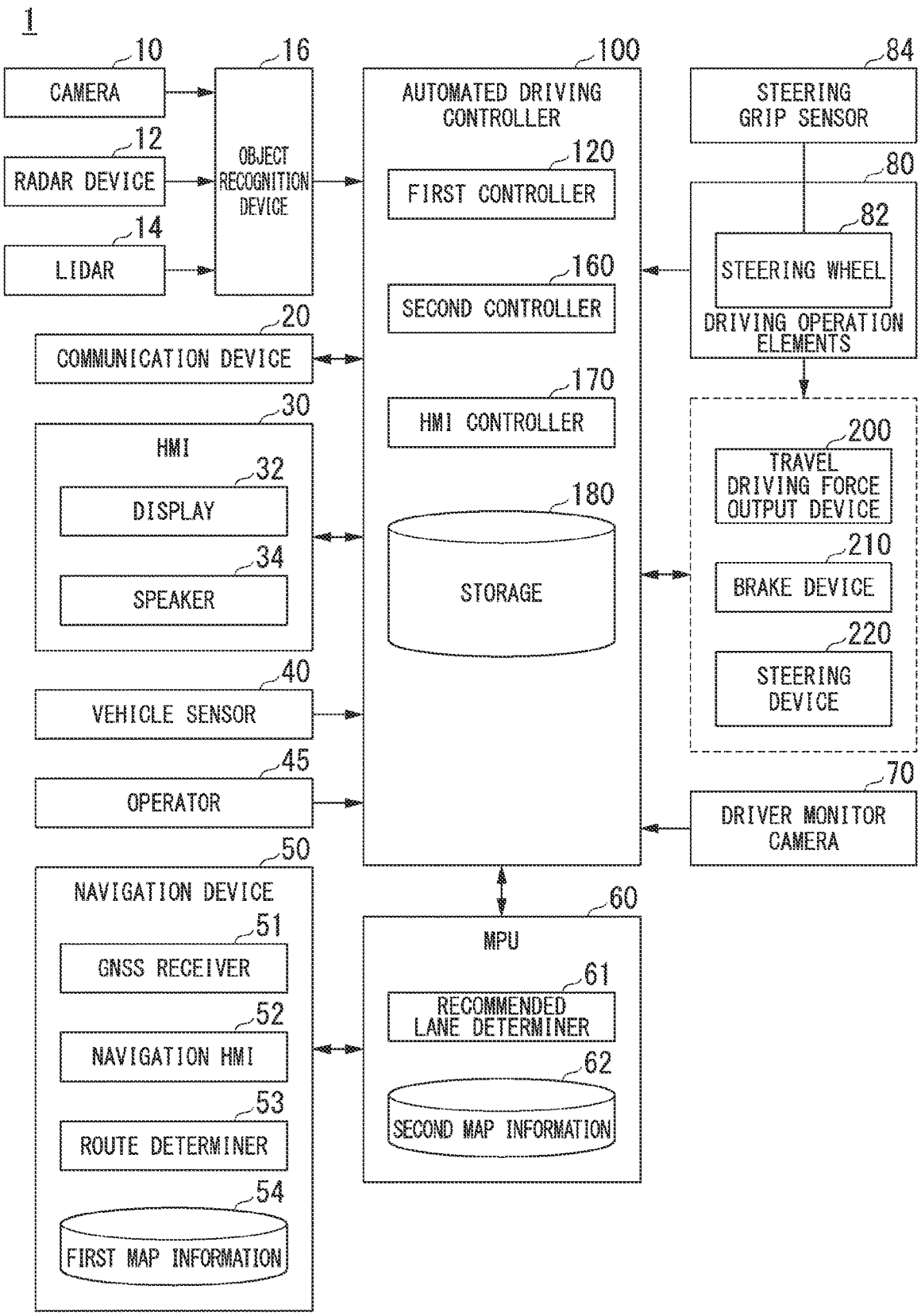
FIG. 1 is a configuration diagram of a vehicle system using a driving assistance device according to an embodiment.

FIG. 1 is a configuration diagram of a vehicle system 1 using the driving assistance device according to an embodiment. A vehicle in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generator connected to the internal combustion engine or electric power when a secondary battery or a fuel cell is discharged.

For example, the vehicle system 1 includes a camera 10, a radar device 12, a light detection and ranging sensor (LIDAR) 14, an object recognition device 16, a communication device 20, a human machine interface (HMI) 30, a vehicle sensor 40, an operator 45, a navigation device 50, a map positioning unit (MPU) 60, a driver monitor camera 70, driving operation elements 80, an automated driving controller 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and some of the components may be omitted or other components may be further added. The HMI 30 is an example of an "output." The operator 45 is an example of a "receiver." The operator 45 and the automated driving controller 100 is an example of a "driving assistance device."

For example, the camera 10 is a digital camera using a solid-state imaging element such as a charge coupled device (CCD) or a complementary metal oxide semiconductor (CMOS). The camera 10 is attached to any position on the vehicle (hereinafter, a vehicle M) in which the vehicle system 1 is mounted. When the view in front of the vehicle M is imaged, the camera 10 is attached to an upper part of a front windshield, a rear surface of a rearview mirror, or the like. For example, the camera 10 periodically and iteratively images the surroundings of the vehicle M. The camera 10 may be a stereo camera.

The radar device 12 radiates radio waves such as millimeter waves around the vehicle M and detects at least a position (a distance to and a direction) of a physical object by detecting radio waves (reflected waves) reflected by the physical object. The radar device 12 is attached to any position on the vehicle M. The radar device 12 may detect a position and a speed of the physical object in a frequency modulated continuous wave (FM-CW) scheme.

The LIDAR 14 radiates light (or electromagnetic waves of a wavelength close to an optical wavelength) to the vicinity of the vehicle M and measures scattered light. The LIDAR 14 detects a distance to an object on the basis of a time period from light emission to light reception. The radiated light is, for example, pulsed laser light. The LIDAR 14 is attached to any position on the vehicle M.

The object recognition device 16 performs a sensor fusion process on detection results from some or all of the camera 10, the radar device 12, and the LIDAR 14 to recognize a position, a type, a speed, and the like of a physical object. The object recognition device 16 outputs recognition results to the automated driving controller 100. The object recognition device 16 may output detection results of the camera 10, the radar device 12, and the LIDAR 14 to the automated driving controller 100 as they are. The object recognition device 16 may be omitted from the vehicle system 1.

The communication device 20 communicates with another vehicle in the vicinity of the vehicle M using, for example, a cellular network, a Wi-Fi network, Bluetooth (registered trademark), dedicated short range communication (DSRC), or the like, or communicates with various types of server devices via a radio base station.

The HMI 30 outputs various types of information to the occupant of the vehicle M under the control of the HMI controller 170. The HMI 30 may function as a receiver that receives an input operation by the occupant. The HMI 30 includes, for example, a display 32 and a speaker 34. The HMI 30 may include a microphone, a buzzer, a key, an indicator lamp and the like.

The display 32 is, for example, a liquid crystal display (LCD), an organic electro-luminescence (EL) display, or the like. The display 32 is provided, for example, near the front of the driver's seat (the seat closest to the steering wheel) on an instrument panel, and is installed at a position where the occupant (specifically, the driver) can perform visual recognition from the steering wheel gap or through the steering wheel. Information necessary for traveling during manual driving or automated driving of the vehicle M (hereinafter referred to as driving assistance information) is displayed as an image on the display 32. The driving assistance information includes, for example, information such as a speed of the vehicle M, an engine speed, the remaining amount of fuel, a radiator water temperature, a traveling distance, a state of a shift lever, a lane (a marking) or other vehicles recognized by the object recognition device 16, the automated driving controller 100, or the like, a lane in which the vehicle M should travel, and a future target trajectory. The driving assistance information may include information about switching of a driving mode to be described below, information about a traveling state based on driving assistance, information about a lane change based on the driving assistance (information about the suggestion of the lane change and the cancelation of the lane change), and the like.

The display 32 may be installed near the center of the instrument panel in addition to the above-described position. In this case, in addition to the driving assistance information, the display 32 displays, for example, an image showing a navigation result of the navigation device 50 and the like. The display 32 may display a television program or may display content stored in a DVD or content such as a movie downloaded from an external device via the communication device 20.

The display 32 may include, for example, a head-up display (HUD). The HUD, for example, projects an image onto a part of the front windshield in front of the driver's seat so that the eyes of the occupant sitting in the driver's seat can see the virtual image. For example, the driving assistance information or the like is displayed on the HUD. The display 32 may be configured as a touch panel having a function of a receiver that receives an operation input from the occupant.

At least one speaker 34 is installed within a cabin. For example, the speaker 34 outputs speech, a warning sound, or the like under the control of the HMI controller 170.

The vehicle sensor 40 includes a vehicle speed sensor configured to detect the speed of the vehicle M, an acceleration sensor configured to detect acceleration, a yaw rate sensor configured to detect an angular speed around a vertical axis, a direction sensor configured to detect a direction of the vehicle M, and the like. The vehicle sensor 40 may include a position sensor that acquires a position of the vehicle M. The position sensor is, for example, a sensor that acquires position information (longitude/latitude information) from a Global Positioning System (GPS) device. The position sensor may be a sensor that acquires position information using a global navigation satellite system (GNSS) receiver 51 of the navigation device 50.

The operator 45 receives an operation of the occupant of the vehicle M. The operator 45 includes, for example, a mode changeover switch that receives an operation of switching the driving mode to be described below, an approval switch that approves the suggestion of the lane change under the control of the system side (the automated driving controller 100 side), and a cancelation switch that cancels the execution of the approved lane change, and the like. The approval switch and the cancelation switch may be included in one switch. In this case, for example, the approval and cancellation operations can be performed when the switch is turned on and off. For the operator 45, for example, a mechanical switch is attached to a steering wheel, an instrument panel, or the like. The operator 45 is configured integrally with the HMI 30, and for example, the above-mentioned switch may be displayed as a graphical user interface (GUI) switch on the display 32.

For example, the navigation device 50 includes the GNSS receiver 51, a navigation HMI 52, and a route determiner 53. The navigation device 50 retains first map information 54 in a storage device such as a hard disk drive (HDD) or a flash memory. The GNSS receiver 51 identifies a position of the vehicle M on the basis of a signal received from a GNSS satellite. The position of the vehicle M may be identified or corrected by an inertial navigation system (INS) using an output of the vehicle sensor 40. The navigation HMI 52 includes a display, a speaker, a touch panel, keys, and the like. The navigation HMI 52 may be partly or wholly shared with the above-described HMI 30. For example, the route determiner 53 determines a route (hereinafter referred to as a route on a map) from the position of the vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include curvature of a road, point of interest (POI) information, and the like. The route on the map is output to the MPU 60. The navigation device 50 may perform route guidance using the navigation HMI 52 based on the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane determiner 61 and stores second map information 62 in a storage device such as an HDD or a flash memory. The recommended lane determiner 61 divides the route on the map provided from the navigation device 50 into a plurality of blocks (for example, divides the route every 100 [m] in a traveling direction of the vehicle), and determines a recommended lane for each block with reference to the second map information 62. For example, the recommended lane determiner 61 determines in what lane numbered from the left the vehicle will travel when a road on which the vehicle M is currently traveling or will travel in the near future has a plurality of lanes. The recommended lane determiner 61 determines the recommended lane so that the vehicle M can travel along a reasonable route for traveling to a branching destination when there is a branch point in the route on the map.

The second map information 62 is map information which has higher accuracy than the first map information 54. For example, the second map information 62 includes information about a center of a lane, information about a boundary of a lane, and the like. The second map information 62 may include road information (a type of road), the number of lanes of the road, the presence or absence of a branch point or a merge point, legal speeds (a speed limit, a maximum speed, and a minimum speed), traffic regulation information, address information (an address/postal code), facility information, telephone number information, and the like. The second map information 62 may be updated at any time when the communication device 20 communicates with another device.

The driver monitor camera 70 is, for example, a digital camera that uses a solid-state image sensor such as a CCD or a CMOS. For example, the driver monitor camera 70 is attached to any location on the vehicle M with respect to a position and a direction where the head of an occupant (hereinafter referred to as a driver) sitting in the driver's seat of the vehicle M can be imaged from the front (in a direction in which his/her face is imaged). For example, the driver monitor camera 70 is attached to an upper part of a display provided on the central portion of the instrument panel of the vehicle M.

The driving operation elements 80 include, for example, an accelerator pedal, a brake pedal, a shift lever, and other operation elements in addition to the steering wheel 82. A sensor for detecting an amount of operation or the presence or absence of an operation is attached to the driving operation element 80 and a detection result is output to the automated driving controller 100 or some or all of the travel driving force output device 200, the brake device 210, and the steering device 220. The steering wheel 82 is an example of an "operation element for receiving a steering operation by the driver." The operation element does not necessarily have to be annular and may be in the form of a variant steering wheel, a joystick, a button, or the like. A steering grip sensor 84 is attached to the steering wheel 82. The steering grip sensor 84 is implemented by a capacitance sensor or the like, and outputs a signal for detecting whether or not the driver is gripping the steering wheel 82 (indicating that the driver is in contact with the steering wheel 82 in a state in which a force is applied) to the automated driving controller 100.

The automated driving controller 100 includes, for example, a first controller 120, a second controller 160, an HMI controller 170, and a storage 180. Each of the first controller 120, the second controller 160, and the HMI controller 170 is implemented, for example, by a hardware processor such as a central processing unit (CPU) executing a program (software). Some or all of the above components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be prestored in a storage device (a storage device including a non-transitory storage medium) such as an HDD or a flash memory of the automated driving controller 100 or may be stored in a removable storage medium such as a DVD or a CD-ROM and installed in the HDD or the flash memory of the automated driving controller 100 when the storage medium (the non-transitory storage medium) is mounted in a drive device. A combination of the action plan generator 140 and the second controller 160 is an example of a "driving controller." The HMI controller 170 is an example of an "output controller."

The storage 180 may be implemented by the above-described various types of storage devices or a solid-state drive (SSD), an electrically erasable programmable read-only memory (EEPROM), a read-only memory (ROM), a random-access memory (RAM), or the like. The storage 180 stores, for example, information, a program, various other types of information, and the like necessary for providing the driving assistance in the present embodiment.

Figure 2:
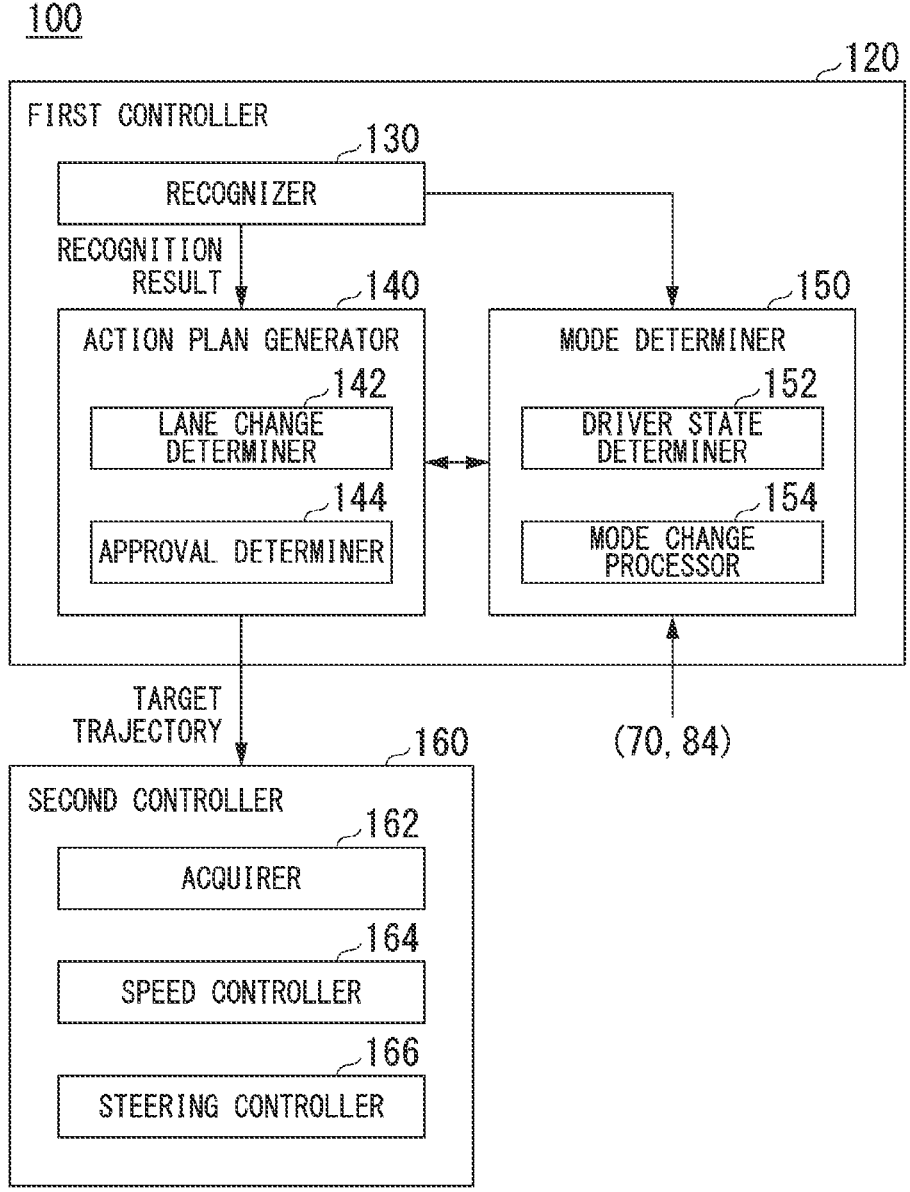
FIG. 2 is a functional configuration diagram of a first controller and a second controller.

FIG. 2 is a functional configuration diagram of the first controller 120 and the second controller 160. The first controller 120 includes, for example, a recognizer 130, the action plan generator 140, and a mode determiner 150. For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (signals, road markings, or the like with which pattern matching is possible) in parallel and performing comprehensive evaluation by assigning scores to both the recognitions. Thereby, the reliability of automated driving is secured.

The recognizer 130 recognizes states of positions (or relative positions), speeds (or relative speeds), acceleration, and the like of physical objects (for example, other vehicles or other obstacles) near the vehicle M on the basis of information input from the camera 10, the radar device 12, and the LIDAR 14 via the object recognition device 16. For example, the position of the physical object is recognized as a position on absolute coordinates with a representative point (a center of gravity, a driving shaft center, or the like) of the vehicle M as the origin and is used for control. The position of the physical object may be represented by a representative point such as a center of gravity or a corner of the physical object or may be represented by a represented area. The "state" of a physical object may include acceleration or jerk of the physical object or an "action state" (for example, whether or not a lane change is being made or intended) when the physical object is a moving object such as another vehicle.

For example, the recognizer 130 recognizes a lane in which the vehicle M is traveling (a traveling lane). For example, the recognizer 130 recognizes the traveling lane by comparing a pattern of a road marking (for example, an arrangement of solid lines and broken lines) obtained from the second map information 62 with a pattern of road markings in the vicinity of the vehicle M recognized from an image captured by the camera 10. The recognizer 130 may recognize the traveling lane by recognizing a traveling path boundary (a road boundary) including a road marking, a road shoulder, a curbstone, a median strip, a guardrail, or the like as well as a road marking. In this recognition, a position of the vehicle M acquired from the navigation device 50 or a processing result of the INS may be added. The recognizer 130 recognizes a temporary stop line, an obstacle, red traffic light, a toll gate, a road sign, and other road events. The recognizer 130 recognizes an adjacent lane adjacent to the traveling lane. The adjacent lane is, for example, a lane in which traveling is possible in the same direction as the traveling lane.

When the traveling lane is recognized, the recognizer 130 recognizes a position or an orientation of the vehicle M with respect to the traveling lane. For example, the recognizer 130 may recognize a gap of a reference point of the vehicle M from the center of the lane and an angle formed with respect to a line connected to the center of the lane in a traveling direction of the vehicle M as a relative position and an orientation of the vehicle M related to the traveling lane. Alternatively, the recognizer 130 may recognize a position of the reference point of the vehicle M related to one side end (a road marking or a road boundary) of the traveling lane or the like as a relative position of the vehicle M related to the traveling lane. Here, the reference point of the vehicle M may be the center of the vehicle M or the center of gravity. The reference point may be an end (a front end or a rear end) of the vehicle M or may be a position where one of a plurality of wheels provided in the vehicle M is present.

The action plan generator 140 generates a future target trajectory along which the vehicle M automatedly travels (independently of the driver's operation) so that the vehicle M can generally travel in the recommended lane determined by the recommended lane determiner 61 and cope with a surrounding situation of the vehicle M. For example, the target trajectory includes a speed element. For example, the target trajectory is represented by sequentially arranging points (trajectory points) at which the vehicle M is required to arrive. The trajectory points are points at which the vehicle M is required to arrive for each prescribed traveling distance (for example, about several meters [m]) along a road. In addition, a target speed and target acceleration for each prescribed sampling time (for example, about several tenths of a second [sec]) are generated as parts of the target trajectory. The trajectory point may be a position at which the vehicle M is required to arrive at the sampling time for each prescribed sampling time. In this case, information about the target speed or the target acceleration is represented by an interval between the trajectory points. When a set speed of the vehicle M is predetermined, the action plan generator 140 may generate a target trajectory so that the speed of the vehicle M becomes the set speed within a range in which the vehicle M can travel.

The action plan generator 140 may set an automated driving event (function) when a target trajectory is generated. Automated driving events include a constant-speed traveling event, a low-speed tracking event, a lane change event, a branch point-related movement event, a merge point-related movement event, a takeover event, and the like. The action plan generator 140 generates a target trajectory according to an activated event. When the action plan generator 140 executes the driving control of the vehicle M, a prescribed event, or the like, the action plan generator 140 may suggest (recommend) the driving control and the execution of the event to the occupant in accordance with a driving mode of the vehicle M to be described below and generate a corresponding target trajectory if the suggestion has been approved.

The action plan generator 140 includes, for example, a lane change determiner 142 and an approval determiner 144. Details of functions of these components will be described below.

The mode determiner 150 sets the driving mode executed by the vehicle M to any one of a plurality of driving modes in which tasks imposed on the occupant are different (in other words, a plurality of modes having different degrees of automation) on the basis of a situation of the vehicle M and the like. The driving controller causes the vehicle M to travel in the mode determined by the mode determiner 150. The mode determiner 150 includes, for example, a driver state determiner 152 and a mode change processor 154.

FIG. 3 is a diagram showing an example of relationships between driving modes, control states of the vehicle M, and tasks.

The driving modes of the vehicle M include, for example, five modes from mode A to mode E. A degree of automation of the control state, i.e., the driving control of the vehicle M, is highest in mode A among modes A to E, decreases in the order of mode B, mode C, and mode D, and is lowest in mode E. In contrast, the task imposed on the occupant is mildest in mode A, becomes severer in the order of mode B, mode C, and mode D, and is severest in mode E in which manual driving is performed. In modes B to E, the control state is not automated driving, so the automated driving controller 100 is responsible for ending the control related to automated driving and performing the shift to driving assistance or manual driving. Modes A and B are examples of a "first driving mode" and mode C is an example of a "second driving mode." Hereinafter, details of each mode for the driver that is an example of the occupant will be described.

In mode A, the state is an automated driving state and any one of tasks of monitoring the surroundings of the vehicle M and gripping the steering wheel 82 (hereinafter referred to as a "steering grip") is not imposed on the driver. It is determined whether or not the driver is monitoring the surroundings on the basis of, for example, a captured image analysis result of the driver monitor camera 70 and it is determined whether or not the driver is gripping the steering according to, for example, a detection result of the steering grip sensor 84. Surrounding monitoring includes at least monitoring in front of the vehicle M. The front is a space in the traveling direction of the vehicle M that is visually recognized via a front windshield. However, even in mode A, the driver is required to be in a posture in which a fast shift to manual driving is enabled in response to a request from the system centered on the automated driving controller 100. The term "automated driving" mentioned herein means that both the steering and speed of the vehicle M are controlled without depending on the driver's operation.

For example, mode A is a driving mode that is executable when a condition in which the vehicle M is traveling at a prescribed speed (for example, about 50 [km/h]) or less on a motorway such as an expressway and there is a preceding vehicle to be tracked is satisfied and may be referred to as a "TJP mode." When the condition for traveling in mode A is no longer satisfied or when the mode switching operation has been received by the operator 45, the mode determiner 150 changes the driving mode of the vehicle M to another mode (for example, mode B).

The driver can execute a second task while mode A is being executed. The second task is, for example, an act other than the driver's driving permitted during the automated driving of the vehicle M. Second tasks include, for example, watching television, making portable phone calls, sending and receiving emails, eating, and the like.

In mode B, the state is a driving assistance state and a task of monitoring the surroundings of the vehicle M (hereinafter, surrounding monitoring) is imposed on the driver, but the task of gripping the steering wheel 82 is not imposed on the driver. In mode B, for example, ACC, ALC, LKAS, and the like are executed. ACC, ALC, and LKAS may also be executed, for example, in modes C and D under the restriction of a prescribed task. For example, in mode B, the lane change (ALC) of the vehicle M based on a process in which the navigation device 50 sets a route to a destination or the like is made according to the determination of the vehicle system 1 side in a state in which the lane change instruction is not received from the driver. The lane change is used to move the vehicle M from a host vehicle lane in which the vehicle M is traveling to an adjacent lane adjacent to the host vehicle lane.

In mode C, the state is a driving assistance state and the task of monitoring surroundings and the task of gripping the steering wheel 82 are imposed on the driver. In mode C, for example, a suggestion is sent to the driver via the HMI 30 when it is determined that the lane change of the vehicle M is required on the vehicle system 1 side and the lane change is made according to driving control for controlling at least the steering among the steering, the acceleration, and the deceleration of the vehicle M when the approval of the lane change by the driver has been received from the operator 45.

In the case of mode C, even in a state in which the lane change cannot be made the present time point, if it is determined that it is preferable to make the lane change on the vehicle system 1 side in the future, a suggestion may be sent to the driver and the lane change according to the driving control may be made when the approval (reservation) of the lane change is received and then an execution condition of the lane change of the vehicle M is satisfied on the basis of a surrounding situation and the like. The execution condition of the lane change is, for example, a condition in which the action plan generator 140 generates a target trajectory for making the lane change from the traveling lane of the vehicle M to a lane that is a lane change destination. For example, when there is another vehicle in the traveling lane of the vehicle M or the lane that is the lane change destination, the action plan generator 140 sets a target position serving as the lane change destination and generates a target trajectory for moving to the target position without contact with the other vehicle on the basis of a relative position and/or a relative distance between the vehicle M and the other vehicle. When the target position cannot be set due to traffic situations such as traffic jams or construction work, the action plan generator 140 generates a target trajectory for continuous traveling in the current traveling lane without generating a target trajectory for making the lane change. When the lane change has been approved by the occupant, the action plan generator 140 repeatedly searches for the target position and an action plan for making the lane change is generated as soon as the target position can be set.

The suggestion of the lane change according to driving control (driving assistance) described above may be made when the driving mode is mode B or mode A. When the approval has been obtained for the lane change suggestion, the driving mode is changed to mode C. When no approval has been obtained, mode control for continuing the current mode B or mode A is performed.

Mode D is a driving mode in which a certain degree of driving operation by the driver is required with respect to at least one of steering, acceleration, and deceleration of the vehicle M. In mode D, when an instruction for causing the vehicle M to make a lane change has received from the driver according to an operation on a winker lever, driving control for making the lane change in an indicated direction is performed. The lane change in modes B to D may be an example of a lane change event.

In mode E, all types of steering, acceleration, and deceleration of the vehicle M are in a state of manual driving in which a driving operation by the driver is required. In both modes D and E, the task of monitoring the front of the vehicle M is naturally imposed on the driver. The driving subject in modes C to E is the driver.

The mode determiner 150 determines the driving mode to be executed by the vehicle M on the basis of the state of the driver. For example, the mode determiner 150 may acquire the execution state of the task and change the driving mode of the vehicle M to a driving mode in which the task imposed on the driver is severer when the task associated with the determined driving mode is not executed by the driver. The mode determiner 150 causes the HMI controller 170 to perform a control process of prompting the driver to shift the driving mode to the manual driving of mode E using the HMI 30, for example, when the driver is in a posture in which the driving mode cannot be shifted to manual driving in response to a request from the system (for example, when he or she continues to look outside of an allowable area or when a sign indicating that driving becomes difficult is detected) while mode A is being executed. When there is no response from the driver even though a prescribed time period has elapsed after the HMI controller 170 was allowed to execute a control process of prompting the driver to shift the driving mode to manual driving or when it is estimated that the driver is not in a state in which manual driving is performed, the mode determiner 150 performs a control process of causing the vehicle M to be stopped at a target position according to automated driving and stopping (ending) the automated driving after the vehicle M is stopped. After the automated driving is stopped, the vehicle M is in the state of mode D or E and the vehicle M can be started according to the manual operation of the driver. Hereinafter, the same is true for "stopping of automated driving."

In mode B, when the driver is not monitoring the front, the mode determiner 150 prompts the driver to monitor the surroundings using the HMI 30 and performs a control process of causing the vehicle M to be stopped at the target position and stopping the automated driving if the driver does not respond. When the driver is not monitoring the front in mode C or is not gripping the steering wheel 82, the mode determiner 150 prompts the driver to monitor the surroundings and/or grip the steering wheel 82 using the HMI 30 and performs a control process of causing the vehicle M to be stopped at a target position and stopping automated driving if the driver does not respond. In modes C and D, when the lane change is not executed while the vehicle M reaches a prescribed point, a control process of causing the vehicle M to be stopped at the target position and stopping automated driving may be performed.

The driver state determiner 152 determines whether or not the driver is in a state suitable for driving. For example, the driver state determiner 152 monitors the state of the driver so that the above-described mode is changed and determines whether or not the state of the driver is a state according to the task. For example, the driver state determiner 152 performs a posture estimation process by analyzing an image captured by the driver monitor camera 70 and determines whether or not the driver is in a posture in which the driving mode cannot be shifted to manual driving in response to a request from the system. The driver state determiner 152 performs a line-of-sight estimation process by analyzing the image captured by the driver monitor camera 70 and determines whether or not the driver is monitoring the surroundings (more specifically, the front) of the vehicle M. When it is determined that the state is not a state according to the task for a prescribed time period or more, the driver state determiner 152 determines that the driver is in a state unsuitable for driving of the task. When it is determined that the state is a state according to the task, the driver state determiner 152 determines that the driver is in a state suitable for driving of the task. The driver state determiner 152 may determine whether or not the driver is in a state in which the driving can be changed.

Instead of (or in addition to) the driver's state described above, the mode determiner 150 may determine the driving mode of the vehicle M on the basis of the traveling state of the vehicle M, the presence or absence of the driver's approval for the driving control to be executed, and the like. In this case, the mode determiner 150 determines the driving mode of the vehicle M, for example, on the basis of a determination result of the approval determiner 144. Details of the determination of the driving mode based on the above-described determination result will be described below.

The mode change processor 154 performs various types of processes for making a change from a current driving mode to the mode determined by the mode determiner 150. For example, the mode change processor 154 causes the HMI controller 170 to control the HMI 30 so that the driver is prompted to perform a prescribed operation or issues an instruction for generating a target trajectory for executing or stopping the automated driving. When the operator 45 has received an operation of switching the driving mode of the vehicle M to a prescribed mode, the mode change processor 154 executes various types of processes for executing the mode. When the operator 45 has received the approval of the lane change to be made by the vehicle system 1, the approval of the cancellation of the lane change, or the like, the mode change processor 154 executes various types of processes for switching to the mode associated with content that has been received.

The second controller 160 controls the travel driving force output device 200, the brake device 210, and the steering device 220 so that the vehicle M passes along the target trajectory generated by the action plan generator 140 at the scheduled times.

The second controller 160 includes, for example, an acquirer 162, a speed controller 164, and a steering controller 166. The acquirer 162 acquires information of a target trajectory (trajectory points) generated by the action plan generator 140 and causes a memory (not shown) to store the information. The speed controller 164 controls the travel driving force output device 200 or the brake device 210 on the basis of a speed element associated with the target trajectory stored in the memory. The steering controller 166 controls the steering device 220 in accordance with a degree of bending of the target trajectory stored in the memory. The processes of the speed controller 164 and the steering controller 166 are implemented by, for example, a combination of feedforward control and feedback control. As an example, the steering controller 166 executes feedforward control according to the curvature of the road in front of the vehicle M and feedback control based on a deviation from the target trajectory in combination.

The HMI controller 170 notifies the occupant (the driver) of the vehicle M of prescribed information using the HMI 30. The prescribed information includes, for example, driving assistance information. For example, the HMI controller 170 may generate an image including the above-described prescribed information and cause the display 32 to display the generated image or may generate speech indicating the prescribed information and cause the generated speech to be output from the speaker 34. The HMI controller 170 may output the information received by the HMI 30 and the operator 45 to the communication device 20, the navigation device 50, the first controller 120, and the like. Details of the functions of the HMI controller 170 will be described below.

The travel driving force output device 200 outputs a travel driving force (torque) for enabling the vehicle M to travel to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the second controller 160 or information input from the driving operation element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 160 or the information input from the driving operation element 80 so that brake torque according to a braking operation is output to each wheel. The brake device 210 may include a mechanism configured to transfer the hydraulic pressure generated according to an operation on the brake pedal included in the driving operation elements 80 to the cylinder via a master cylinder as a backup. The brake device 210 is not limited to the above-described configuration and may be an electronically controlled hydraulic brake device configured to control an actuator in accordance with information input from the second controller 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second controller 160 or the information input from the steering wheel 82 of the driving operation element 80 to change the direction of the steerable wheels.

[Lane Change Determiner, Approval Determiner, and HMI Controller]

Figure 4:
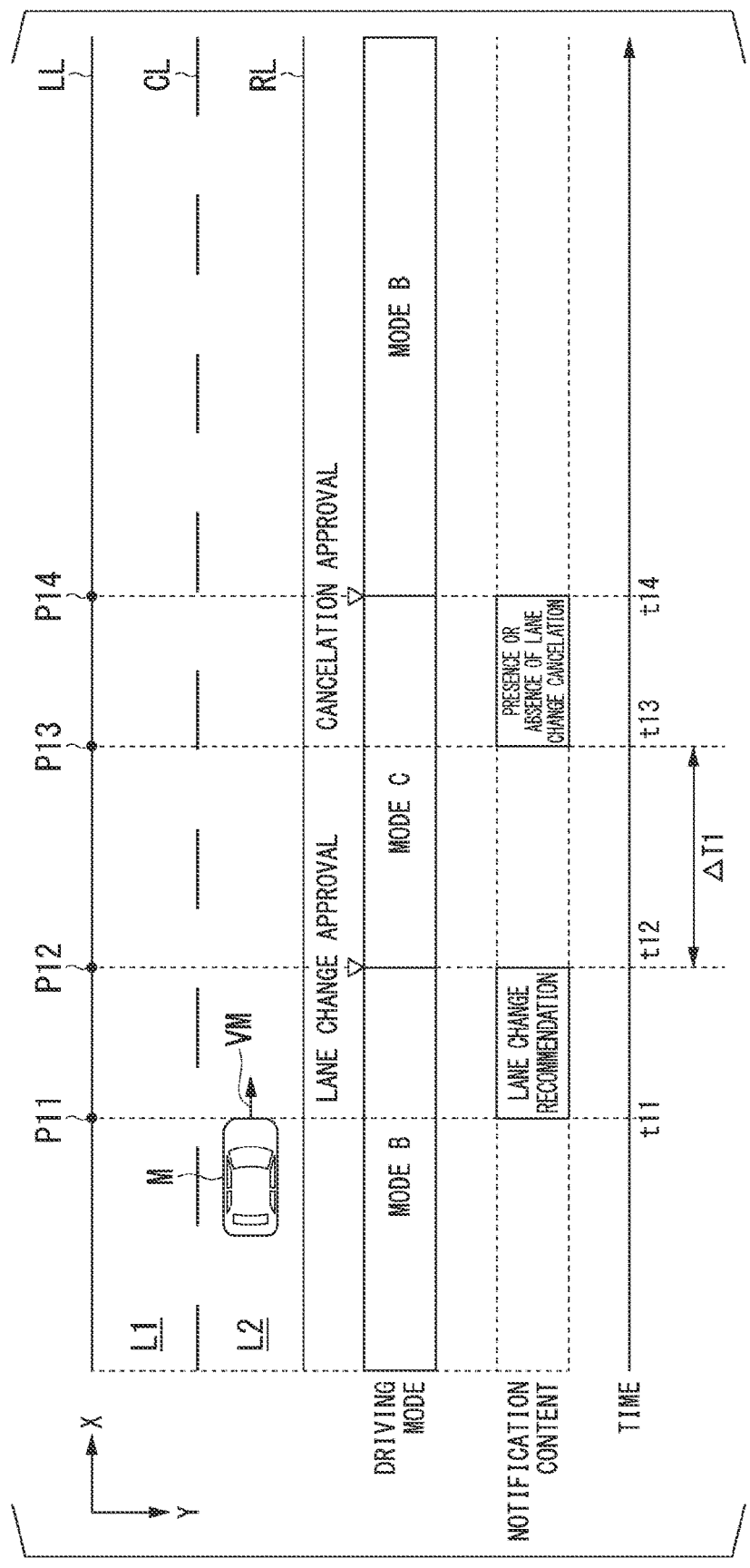
FIG. 4 is a diagram for describing a lane change determiner, an approval determiner, and an HMI controller.

Hereinafter, details of functions of the lane change determiner 142, the approval determiner 144, and the HMI controller 170 will be described. FIG. 4 is a diagram for describing a lane change determiner 142, an approval determiner 144, and an HMI controller 170. In the example of FIG. 4, the vehicle M traveling at a speed VM in the lane L2 between two lanes L1 and L2 in which the vehicle M can travel in the same direction (the X-axis direction in FIG. 4) is shown. The lane L1 is partitioned by markings LL and CL and the lane L2 is partitioned by markings CL and RL. The marking CL is a marking indicating that the lane change can be made between the lanes L1 and L2. The lanes L1 and L2 are, for example, a motorway such as an expressway. In the following description, it is assumed that time t11 is earliest and times t12, t13, t14, t15, t16, and t17 are increasingly later than time t11 in that order. Although it is assumed below that the vehicle M is traveling in mode B at a time point before time t11, the vehicle M may be traveling in mode A.

The lane change determiner 142 determines whether or not to cause the vehicle M to make the lane change according to driving control at the present time point or in the future on the basis of the surrounding situation recognized by the recognizer 130. For example, the lane change determiner 142 determines whether or not to cause the vehicle M to make the lane change on the basis of the traveling lane of the vehicle M and the number of lanes of the road on which the vehicle M can travel in the same direction including the traveling lane. The number of lanes may be recognized, for example, from the captured image of the camera 10 or from the map information (for example, the second map information 62). For example, the lane change determiner 142 compares a recommended lane determined by the recommended lane determiner 61 among a plurality of lanes in which the vehicle M can travel in the same direction with the traveling lane of the vehicle M and determines to cause the vehicle M to make the lane change when the recommended lane is not the same as the traveling lane.

For example, when the vehicle M is traveling in a left lane of a two-lane road and the recommended lane is a right lane thereof, the lane change determiner 142 determines to cause the vehicle M to make the lane change to the right lane. When the vehicle M travels in a right or left lane of three lanes in the traveling direction and the recommended lane is a middle lane thereof, the lane change determiner 142 determines to cause the vehicle M to make the lane change to the middle lane. When a destination is preset by the navigation device 50 or the like, the lane change determiner 142 determines to cause the vehicle M to make the lane change to a lane in which the vehicle M can travel in a destination direction when the traveling lane of the vehicle M is not a lane in which the vehicle M can travel in the destination direction. The lane change determiner 142 determines that it is necessary to make the lane change to the recommended lane when the vehicle M is not traveling in the preset recommended lane even if the vehicle is traveling on a road having four or more lanes.

The lane change determiner 142 may compare the future recommended lane with the traveling lane when a shape of a road on which the vehicle M travels changes in the future (for example, when there is a branch point, a merge point, or an increase or decrease in the number of lanes several kilometers ahead) and determine to cause the vehicle M to make the lane change when the two lanes are different.

In the example of FIG. 4, it is assumed that the lane change determiner 142 determines to cause the vehicle M to make the lane change from the lane L2 to the lane L1 at time t11 when the vehicle M has reached a point P11. In this case, the HMI controller 170 generates an image for suggesting (recommending) a lane change according to driving control, causes the display 32 to output the generated image, and provides an image notification to the driver.

Figure 5:
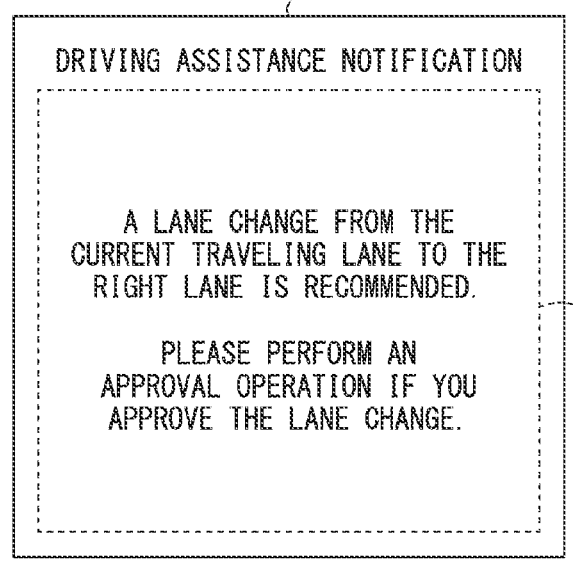
FIG. 5 is a diagram showing an example of a lane change suggestion image.

FIG. 5 is a diagram showing an example of an image IM10 that suggests a lane change. The image IM10 includes, for example, a suggestion content display area A11. In the suggestion content display area A11, for example, information about the lane change suggestion is displayed. In the example of FIG. 5, in the suggestion content display area A11, text information such as "A lane change from the current traveling lane to the right lane is recommended" and "Please perform an approval operation if you approve the lane change" is displayed. In addition to (or instead of) the above-mentioned text information, the HMI controller 170 may display an image (including an animation image) reminiscent of a lane change for the occupant and cause an indicator lamp indicating a lane change included in the HMI 30 to be turned on. In addition to (or instead of) displaying an image or an indicator, the HMI controller 170 may generate speech indicating the suggestion content (for example, speech corresponding to the text information shown in FIG. 5) and cause the generated speech to be output from the speaker 34 or cause a sound such as an alarm or a sound of a buzzer to be output from the speaker 34. Thereby, the driver of the vehicle M is allowed to easily recognize the fact that the lane change has been suggested from the vehicle system 1 side and the operation content in the case of approval.

The approval determiner 144 determines whether or not the driver's approval for the above-described lane change suggestion has been received. For example, the approval determiner 144 determines that the lane change according to the driving control has been approved when the operator 45 has received a prescribed operation in a state in which the image IM10 has been displayed on the display 32 by the HMI controller 170. The prescribed operation may be, for example, an operation of pressing the approval switch provided on the operator 45 once or an operation of turning the approval switch on in a state in which the image IM10 has been displayed. When the prescribed operation has not been received by the operator 45 within a prescribed time period, the approval determiner 144 may determine that the approval has not been received. When the approval has not been received, the lane change is not made.

In the example of FIG. 4, it is assumed that the approval determiner 144 determines that the driver's approval (lane change approval) for the lane change suggestion has been received at time t12 when the vehicle M has reached a point P12 after the image IM10 was displayed at time t11. In this case, the mode determiner 150 changes the driving mode of the vehicle M from mode B to mode C. After changing to mode C, the task of gripping the steering as well as the task of monitoring the surroundings is imposed on the driver. The action plan generator 140 searches for a target position of a lane L1 that is a lane change destination on the basis of the surrounding situation recognized by the recognizer 130, generates a target trajectory for causing a lane change for a target position to be made at a time point when the target position has been found in the search, and starts the lane change according to the generated target trajectory.

The action plan generator 140 generates an action plan for continuous traveling in the lane L2 when the target position cannot be set due to the presence of another vehicle traveling in the lane L1 or an obstacle such as a construction work area, and causes the vehicle M to travel according to the generated action plan. If the driver cannot make the lane change for a long time after approving the lane change, he or she is likely to forget that he or she has approved the lane change. Thus, if the lane change is made after a while from the lane change instruction, there is a possibility that the driver will be surprised and an unnecessary steering or brake operation will be performed because the lane change is made in a state in which the occupant is not expecting the lane change. Therefore, the HMI controller 170 causes the HMI 30 to output information about the lane change when the lane change has not been started by the driving controller even though the first prescribed time period has elapsed after the lane change was approved. The term "the lane change has not been started" indicates that, for example, the execution condition of the lane change is not satisfied. "The lane change has not been started" may indicate that the vehicle M is entirely on the lane L2 side, that an amount of lateral movement to the lane change destination (the lane L2 side) (an amount of lateral movement of the road or an amount of movement in a —Y-axis direction in FIG. 4) is less than a prescribed amount, and that a steering angle of the vehicle M due to a lane change is less than a prescribed angle. The information about the lane change includes, for example, information about the traveling state of the vehicle M related to the lane change or information about the cancellation of the lane change. The information about the cancellation of the lane change includes, for example, whether or not it is necessary to cancel the approved lane change (whether or not the cancellation is necessary), information about an operation method of canceling the lane change, and the like.

Figure 6:
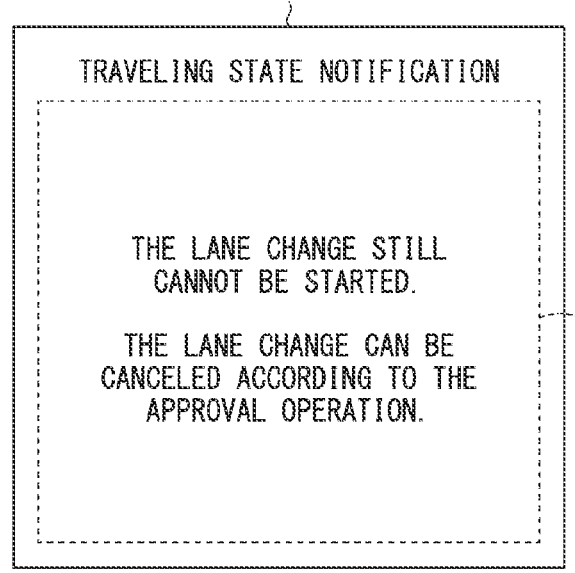
FIG. 6 is a diagram showing an example of an image showing information about a lane change.

In the example of FIG. 4, the HMI controller 170 generates an image showing information about the lane change at time t13 when a first prescribed time period (ΔT1) has elapsed (when the vehicle M has reached a point P13) from time t12 and causes the display 32 to display the generated image. FIG. 6 is a diagram showing an example of an image IM20 showing information about a lane change. The image IM20 includes, for example, a traveling state display area A21. In the traveling state display area A21, text information such as "The lane change still cannot be started" and "The lane change can be canceled according to the approval operation" is displayed as the information about the lane change.

By displaying the image IM20 shown in FIG. 6, it is possible to allow the driver to ascertain that the vehicle M is trying to make the lane change according to the driving control, but the lane change cannot be started due to the surrounding situation or the like. Therefore, it is possible to make it more difficult for the driver to forget that he or she has approved the lane change according to the driving control (or it is possible to remind the driver of the fact). Further, it is possible to limit an erroneous operation when the lane change is desired to be canceled by displaying information about the cancelation of the lane change. When the HMI controller 170 notifies the driver of the information about the lane change, the HMI controller 170 provides the notification to the driver only by displaying the image IM20 without providing the notification by speech. Thereby, it is possible to reduce an annoyance feeling given to the driver with respect to the notification.

The approval determiner 144 determines whether or not the execution of the approved lane change according to the driving control has been canceled (or whether or not the cancellation of the lane change has been approved) according to whether or not a prescribed operation has been received by the operator 45 in a state in which the image IM20 has been displayed on the display 32 by the HMI controller 170. The time period during which the image IM20 has been displayed is a time period for the driver to determine whether or not to continue the lane change. For example, in a state in which the image IM20 has been displayed, the prescribed operation may be an operation of pressing the cancelation switch provided on the operator 45 once or an operation of pressing the approval switch once or turning the approval switch off.

In FIG. 4, it is assumed that the approval determiner 144 determines that the lane change has been canceled (the cancelation thereof has been approved) at time t14 when the vehicle M has reached a point P14, for example, in a state in which the image IM20 was displayed at time t13. In this case, the driving controller stops the lane change to the lane L1. The mode determiner 150 changes the driving mode from mode C to mode B and the driving control for traveling in the lane L2 is executed.

Figure 7:
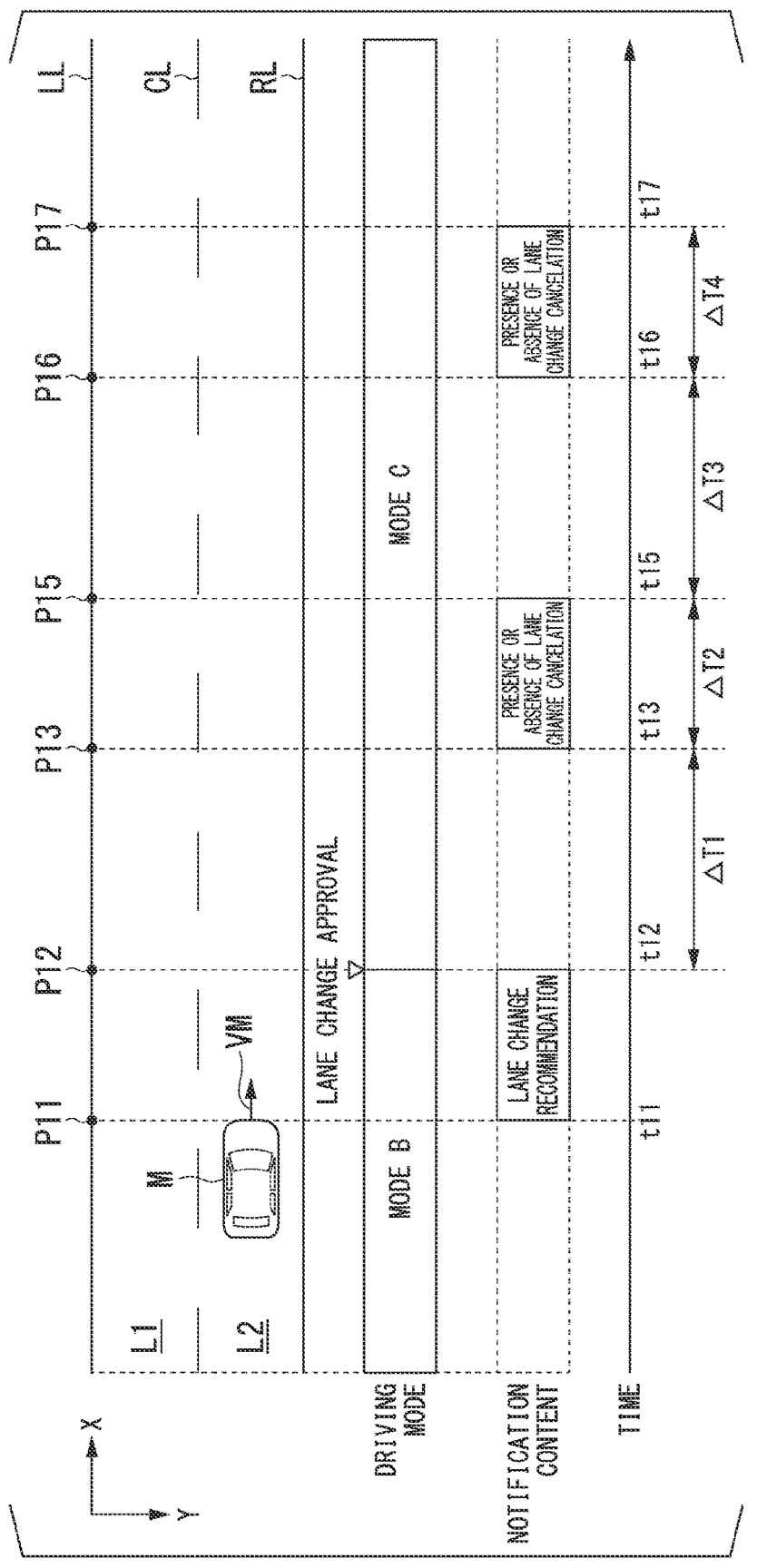
FIG. 7 is a diagram for describing a case where a lane change has not been canceled by the approval determiner.

FIG. 7 is a diagram for describing a case where the lane change has not been canceled by the approval determiner 144. Because the processing up to time t13 in FIG. 7 is similar to the above-described processing, the processing after time t13 will be specifically described. At time t13, the HMI controller 170 causes the display of the image IM20 to end when a prescribed operation has not been received by the operator 45 even though the second prescribed time period has elapsed, for example, after the image IM20 was displayed on the display 32. The second prescribed time period is shorter than the first prescribed time period. As shown in FIG. 7, the HMI controller 170 causes the display of the image IM20 to end at time t15 when a second prescribed time period (ΔT2) has elapsed from time t13 when the image IM20 has been displayed (or at a time point when the vehicle M has reached a point P15). Thereby, it is possible to ascertain that the vehicle M is trying to make the lane change according to the driving control by displaying the image IM20 and reduce the annoyance given to the driver with respect to the notification by ending the display of the image IM20 in a time period shorter than the first prescribed time period. Because the lane change according to the driving control is continued when the driver does not perform a lane change cancelation operation (a cancellation approval operation), the convenience of the driver can be improved as compared with a case where an operation of continuing the lane change is performed every time the image IM20 is displayed.

Because the approval of the lane change is continued after time t13, the driving controller causes the lane change to the lane L1 to be made if the execution condition of the lane change to the lane L1 is satisfied.

The HMI controller 170 may cause the display 32 to display the image IM20 again at time t16 when a third prescribed time period (ΔT3) has elapsed (when the vehicle M has reached a point P16) after the display of the image IM20 was ended at time t15. The third prescribed time period is, for example, a time period equal to the first prescribed time period. The third prescribed time period may be changed in accordance with the number of times the image IM20 is displayed or a display time period (a total display time period). For example, as the number of notifications to the driver or a notification time period according to the display of the image IM20 increase, it is predicted that it will be difficult for the occupant to forget that the lane change has been approved. Thus, the HMI controller 170 sets the third prescribed time period to a time period longer than the first prescribed time period as the number of times the image IM20 is displayed or the display time period increases. The HMI controller 170 may perform control for canceling the next display once according to the number of display processes or the display time period of the image IM20. The third prescribed time period may be adjusted so that the third prescribed time period becomes a longer time period when a traveling distance of the vehicle M is longer in a state in which the image IM20 has been displayed. In this way, by adjusting an interval at which the image IM20 is displayed again, it is possible to reduce the annoyance caused by the display of the image IM20. By repeatedly displaying the image IM20, it is possible to prevent the driver from forgetting that the lane change has been approved, so that more appropriate driving assistance can be implemented.

The HMI controller 170 causes the display of the image IM20 to end when a prescribed operation has not been received by the operator 45 even at time t17 when a fourth prescribed time period ΔT4 elapsed (a time point when the vehicle M reached a point P17) after the image IM20 was displayed at time t16. The fourth prescribed time period is a time period equal to the second prescribed time period. The fourth prescribed time period may be shortened in accordance with the number of times the image IM20 is displayed and the display time period (a total display time period). However, the HMI controller 170 adjusts the fourth prescribed time period so that the fourth prescribed time period is not less than a predetermined minimum display time period. The HMI controller 170 causes the image IM20 to be displayed repeatedly on the basis of the third prescribed time period and the fourth prescribed time period when the lane change is not started even after time t17 and the cancellation of the lane change is not approved.

[Processing Flow]

Figure 8:
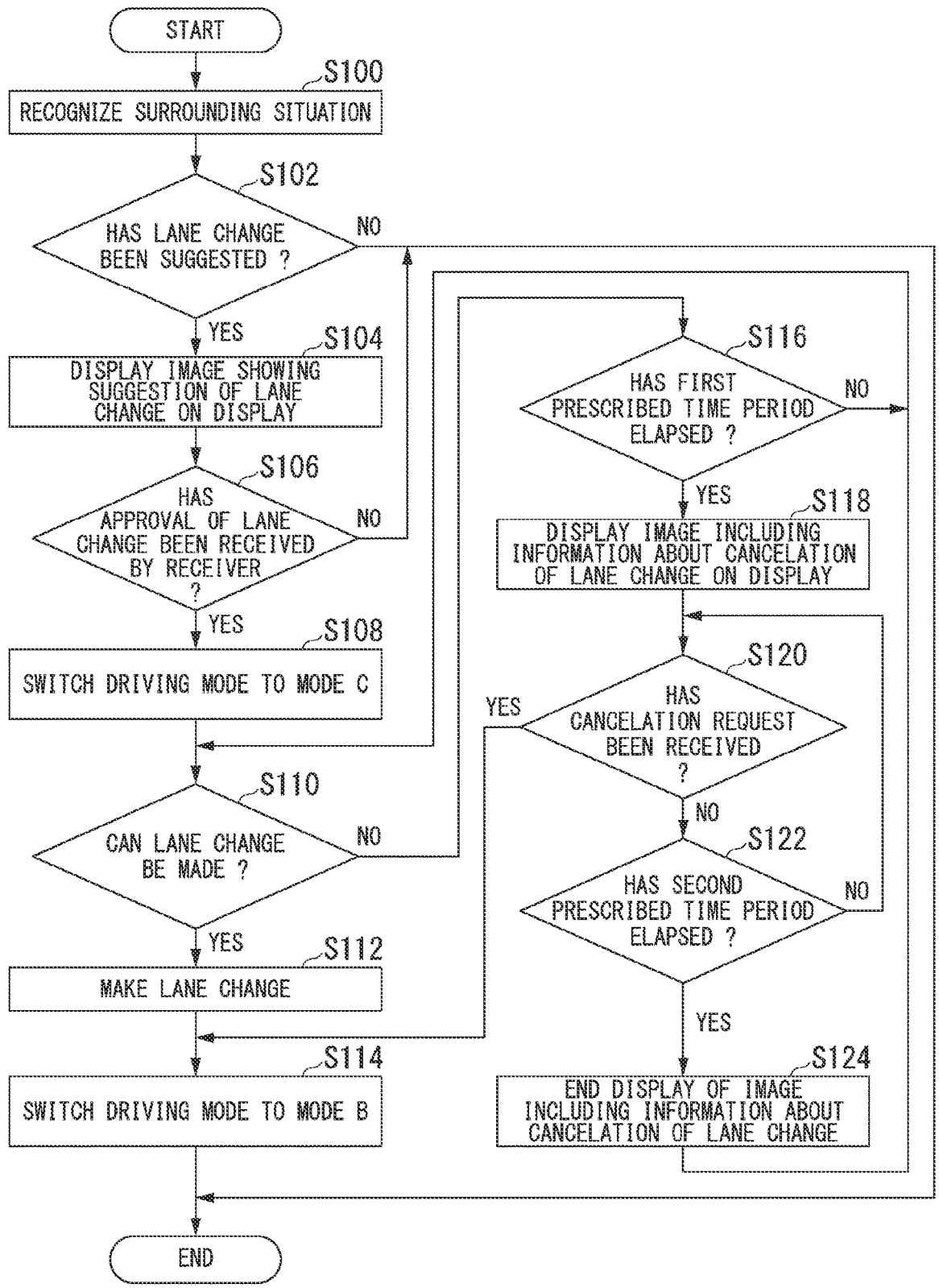
FIG. 8 is a flowchart showing an example of a flow of a process executed by an automated driving controller of the embodiment.

FIG. 8 is a flowchart showing an example of a flow of a process executed by the automated driving controller 100 of the embodiment. Hereinafter, processes related to the suggestion of the lane change from the vehicle system 1 side, the approval of the suggestion, and the cancellation of the lane change among the processes executed by the automated driving controller 100 will be mainly described. It is assumed that the vehicle M is traveling in mode B when the following process is executed. In the following process, it is assumed that the driver's state determined by the driver state determiner 152 is a state corresponding to a task imposed on the driver in the driving mode executed by the vehicle M. Therefore, the mode according to the state of the driver is not changed in the process of FIG. 8.

In the example of FIG. 8, the recognizer 130 recognizes a surrounding situation of the vehicle M (step S100). Subsequently, the lane change determiner 142 determines whether or not to suggest a lane change of the vehicle M on the basis of the recognized surrounding situation of the vehicle M or the like (step S102). When it is determined to suggest the lane change, the HMI controller 170 generates an image (for example, the image IM10) showing the lane change suggestion and causes the display 32 to output the generated image (step S104).

Subsequently, the approval determiner 144 determines whether or not the approval of the suggested lane change has been received by the operator 45 (step S106). When it is determined that the approval of the lane change has been received, the mode determiner 150 determines to switch the driving mode of the vehicle M from mode B to mode C (step S108). Thereby, the driving controller switches the mode from mode B to mode C. Subsequently, the action plan generator 140 determines whether or not the lane change to the lane change destination can be made (step S110). When it is determined that the lane change can be made, the driving controller causes the lane change to the lane change destination to be made (step S112). Subsequently, the mode determiner 150 determines to change the driving mode of the vehicle M from mode C to mode B (step S114). Thereby, the mode is switched to mode B by the driving controller.

When the lane change cannot be made after the approval of the lane change (in other words, when the lane change has not been started) in the processing of step S110, the action plan generator 140 determines whether or not the first prescribed time period has elapsed after the reception of the approval of the lane change (step S116). When it is determined that the first prescribed time period has not elapsed, the process returns to the processing of step S110. When it is determined that the first prescribed time period has elapsed, the HMI controller 170 generates an image (for example, the image IM20) including information about the cancelation of the lane change and causes the display to display the generated image (step S118).

Subsequently, the HMI controller 170 determines whether or not the approval for canceling the lane change has been received (step S120). When it is determined that the cancellation approval has been received, the driving controller executes the processing of step S114 (a process of switching the driving mode from mode C to mode B) without causing the lane change to be made. When it is determined that the cancellation approval has not been received, the HMI controller 170 determines whether or not the second prescribed time period has elapsed after the image including the information about the cancellation of the lane change was displayed on the display 32 (step S122). When it is determined that the second prescribed time period has not elapsed, the process returns to the processing of step S120. When it is determined that the second prescribed time period has elapsed, the HMI controller 170 ends the display of the image including the information about the cancellation of the lane change (step S124) and returns to the processing of step S110. Thereby, the process of the present flowchart is executed. When it is determined that the lane change has not been suggested in the processing of step S102 or when it is determined that the approval of the lane change has not been received by the operator 45 in the processing of step S106, the process of the present flowchart ends.

Modified Examples

In the above-described embodiment, although control is performed when a prescribed operation has been received by the operator 45 after the image IM10 and the image IM20 was displayed, an approval determination process or the like may be performed by displaying a graphical user interface (GUI) switch for selecting whether or not to approve (or cancel) the lane change in the image IM10 and the image IM20 and receiving an operation of the driver on the displayed GUI switch instead of the control. In this case, the display 32 (the touch panel) on which an image including the GUI switch is displayed is an example of a "receiver."

According to the above-described embodiment, a driving assistance device includes the recognizer 130 configured to recognize a surrounding situation of the vehicle M; a driving controller configured to control at least steering of the vehicle M on the basis of the surrounding situation recognized by the recognizer 130; the operator (an example of a receiver) 45 configured to receive an operation of an occupant of the vehicle M; and the HMI controller (an example of an output controller) 170 configured to cause the HMI 30 (an example of an output) to output a traveling state of the vehicle M, wherein the driving controller causes a lane change of the vehicle M to be made when the operator 45 receives an instruction for allowing the vehicle M to make the lane change and a condition in which the lane change is made is satisfied, and wherein the HMI controller 170 causes the HMI 30 to output information about the lane change when the lane change has not been started by the driving controller even though a first prescribed time period has elapsed after the operator 45 received the instruction, so that more appropriate driving assistance can be performed.

Specifically, according to the above-described embodiment, when a prescribed time period has elapsed without the lane change being made after the approval of the lane change (after the reservation), it is possible to prevent the driver from forgetting that he or she has approved the lane change according to the elapse of time by providing a notification of information about the lane change and to prevent the driver from being surprised by the execution of the lane change. According to the embodiment, it is possible to improve the convenience of the driver because the lane change is not automatically canceled unless the cancelation operation is performed by including information about whether or not the cancelation of the lane change is required or a cancelation method in information about the lane change whose notification is provided to the occupant. According to the embodiment, the annoyance given to the driver with respect to the notification can be reduced by shortening the display time period of the information about the lane change and only displaying an image for the information about the lane change on the display 32.

The embodiment described above can be represented as follows.

An assistance control device including:
a storage device storing a program; and
a hardware processor,
wherein the hardware processor executes the program stored in the storage device to:
recognize a surrounding situation of a vehicle;
control at least steering of the vehicle on the basis of the recognized surrounding situation in a driving controller;
receive an operation of an occupant of the vehicle;
cause an output to output a traveling state of the vehicle;
cause a lane change of the vehicle to be made when an instruction for allowing the vehicle to make the lane change is received and a condition in which the lane change is made is satisfied; and
cause the output to output information about the lane change when the lane change has not been started by the driving controller even though a first prescribed time period has elapsed after the instruction was received.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A driving assistance device comprising:
a recognizer configured to recognize a surrounding situation of a vehicle;
a driving controller configured to control at least steering of the vehicle on the basis of the surrounding situation recognized by the recognizer;
a receiver configured to receive an operation of an occupant of the vehicle; and
an output controller configured to cause an output to output a traveling state of the vehicle,
wherein the driving controller causes a lane change of the vehicle to be made when a receiver receives an instruction for allowing the vehicle to make the lane change and a condition in which the lane change is made is satisfied,
wherein the output controller causes the output to output information about the lane change when the lane change has not been started by the driving controller even though a first prescribed time period has elapsed after the receiver received the instruction,
wherein the output controller causes a process of outputting the information to end when the receiver has not received an instruction for canceling the lane change even though a second prescribed time period has elapsed after the information about the lane change was output to the output,
wherein the driving controller causes a process of making the lane change to continue,
wherein the output controller causes the output to output information about the lane change when the lane change has not been started by the driving controller even though a third prescribed time period has elapsed after the process of outputting the information was ended, and
wherein the third prescribed time period is a time period equal to the first prescribed time period or a time period that is changed in accordance with the number of times the information about the lane change has been output or the time when the information about the lane change has been output.

2. The driving assistance device according to claim 1, wherein the information about the lane change includes information about cancelation of the lane change.

3. The driving assistance device according to claim 1, wherein the second prescribed time period is shorter than the first prescribed time period.

4. The driving assistance device according to claim 1, wherein the output includes a display, and
wherein the output controller causes the display to display an image showing information about the lane change.

5. A driving assistance method comprising:
recognizing, by a computer, a surrounding situation of a vehicle;
controlling, by the computer, at least steering of the vehicle on the basis of the recognized surrounding situation in a driving controller;
receiving, by the computer, an operation of an occupant of the vehicle;
causing, by the computer, an output to output a traveling state of the vehicle;
causing, by the computer, a lane change of the vehicle to be made when an instruction for allowing the vehicle to make the lane change is received and a condition in which the lane change is made is satisfied;
causing, by the computer, the output to output information about the lane change when the lane change has not been started by the driving controller even though a first prescribed time period has elapsed after the instruction was received,
causing, by the computer, a process of outputting the information to end when the receiver has not received an instruction for canceling the lane change even though a second prescribed time period has elapsed after the information about the lane change was output to the output,
causing, by the computer, a process of making the lane change to continue,
causing, by the computer, the output to output information about the lane change when the lane change has not been started by the computer even though a third prescribed time period has elapsed after the process of outputting the information was ended, and
wherein the third prescribed time period is a time period equal to the first prescribed time period or a time period that is changed in accordance with the number of times the information about the lane change has been output or the time when the information about the lane change has been output.

6. A computer-readable non-transitory storage medium storing a program for causing a computer to:
recognize a surrounding situation of a vehicle;
control at least steering of the vehicle on the basis of the recognized surrounding situation in a driving controller;
receive an operation of an occupant of the vehicle;
cause an output to output a traveling state of the vehicle;
cause a lane change of the vehicle to be made when an instruction for allowing the vehicle to make the lane change is received and a condition in which the lane change is made is satisfied;
cause the output to output information about the lane change when the lane change has not been started by the driving controller even though a first prescribed time period has elapsed after the instruction was received,
cause a process of outputting the information to end when the receiver has not received an instruction for canceling the lane change even though a second prescribed time period has elapsed after the information about the lane change was output to the output,
cause a process of making the lane change to continue,
cause the output to output information about the lane change when the lane change has not been started by the computer even though a third prescribed time period has elapsed after the process of outputting the information was ended, and
wherein the third prescribed time period is a time period equal to the first prescribed time period or a time period that is changed in accordance with the number of times the information about the lane change has been output or the time when the information about the lane change has been output.

* * * * *